US010805013B2

United States Patent
Smolyaninov

(10) Patent No.: US 10,805,013 B2
(45) Date of Patent: Oct. 13, 2020

(54) COMMUNICATION AND SENSOR TECHNIQUES FOR UNDERWATER RADIO COMMUNICATION

(71) Applicant: Saltenna LLC, McLean, VA (US)

(72) Inventor: Igor Smolyaninov, Columbia, MD (US)

(73) Assignee: SALTENNA LLC, McLean, VA (US)

( * ) Notice: Subject to any disclaimer, the term of this patent is extended or adjusted under 35 U.S.C. 154(b) by 0 days.

(21) Appl. No.: 15/861,930

(22) Filed: Jan. 4, 2018

(65) Prior Publication Data

US 2018/0198536 A1 Jul. 12, 2018

Related U.S. Application Data

(60) Provisional application No. 62/447,079, filed on Jan. 17, 2017, provisional application No. 62/443,075, filed on Jan. 6, 2017.

(51) Int. Cl.
*H04B 13/02* (2006.01)
*H04B 7/06* (2006.01)

(52) U.S. Cl.
CPC ........... *H04B 13/02* (2013.01); *H04B 7/0617* (2013.01)

(58) Field of Classification Search
CPC combination set(s) only.
See application file for complete search history.

(56) References Cited

U.S. PATENT DOCUMENTS

| 4,008,469 | A | * | 2/1977 | Chapman | G01S 13/0209 324/337 |
|---|---|---|---|---|---|
| 5,841,288 | A | * | 11/1998 | Meaney | G01N 22/00 324/639 |
| 2003/0135326 | A1 | * | 7/2003 | Brown | G01C 21/20 701/487 |
| 2016/0015993 | A1 | * | 1/2016 | Turner | A61N 1/403 607/101 |
| 2016/0171790 | A1 | * | 6/2016 | Abraham | B63G 8/41 342/53 |

* cited by examiner

*Primary Examiner* — Junpeng Chen
(74) *Attorney, Agent, or Firm* — Pillsbury Winthrop Shaw Pittman, LLP

(57) ABSTRACT

A linear array of underwater radio frequency (RF) antennas is implemented, which emit surface electromagnetic waves propagating along either water-air or water-seafloor interface. The phase difference $\Delta\phi$ between neighboring antennas defines the overall beam direction, while the so-formed directional beam intensity remains almost constant near the antenna array due to the largely two-dimensional character of beam propagation. By adjusting the phase difference $\Delta\phi$, the narrow two-dimensional surface beam may be sent in any direction over 360°, thus enabling targeted RF communication with any desired object located near the said interface. An impedance matching enclosure filled with an impedance matching fluid may also be utilized surrounding the antennas to reduce antenna dimensions and improve coupling of electromagnetic energy to the surrounding salt water medium, thereby improving underwater radio communication performance.

15 Claims, 8 Drawing Sheets

COMMUNICATION AND SENSOR TECHNIQUES FOR UNDERWATER RADIO COMMUNICATION

This application claims priority to U.S. Provisional Patent Application No. 62/443,075 filed on Jan. 6, 2017 and U.S. Provisional Patent Application No. 62/447,079 filed on Jan. 17, 2017, which are incorporated by reference herein in its entirety.

FIELD OF THE INVENTION

The present invention relates generally to the field of advanced underwater radio frequency communication and sensor networks for salt and brackish water environments More particularly, the present invention improves underwater radio communication distance and power in communication and sensor networks via formation of weakly decaying directional surface radio beams, and reduces the physical antenna dimensions and improves underwater radio communication distance and radiated power via simultaneous impedance matching and electromagnetic isolation of the underwater antenna, and will be described in connection with such utility, although other utilities are contemplated.

BACKGROUND OF THE INVENTION

Radio signals are difficult to implement for long distance undersea communication because they are rapidly attenuated in fresh, brackish, and salt water. Performance of conventional RF communication schemes in water are limited by the relatively small RF skin depth, which may be estimated as:

$$\delta = \sqrt{\frac{1}{\pi \mu_0 \sigma v}} \approx \frac{270 \text{ m}}{\sqrt{v}}$$

where $\sigma$ is the water conductivity and $v$ is the communication frequency. This signal attenuation severely limits the ability to communicate over distance in water. For example, at $v=20$ MHz the skin depth in seawater is 6 cm, so conventional implementations of three-dimensional RF communication schemes are impractical in salt water over useful distances.

In particular, at high carrier frequencies (e.g., 1-10 GHz), the radio wave propagates as a normal traveling wave, but attenuates very rapidly with distance, largely due to relatively high ionic conductivity of water. At much lower carrier frequencies (e.g., 1-10 MHz), the radio wave propagates as a diffusion field, which rapidly degrades the signal-to-noise ratio to unity. Therefore, radio signals are difficult to implement for robust long distance undersea communication. While the communication distance improves at lower frequencies, the required antenna dimensions become impractical.

Efficient coupling to surface electromagnetic modes (such as the surface wave at the seawater/air interface) may enable much longer communication distances. The penetration depth $L_z$ and the propagation distance $L_r$ of a surface wave are given by the following expressions:

$$L_z \approx \frac{\lambda_0}{4\pi\sqrt{\varepsilon''}}, \text{ and } L_r \approx \frac{\lambda_0 \varepsilon''}{\pi},$$

where $\varepsilon$ is the imaginary part of the dielectric constant of seawater. Over these depths/distances the signal attenuates by a factor of $e^{-1}$ (i.e., exponential with distance). Thus, at 20 MHz the signal propagation distance appears to be rather large ($L_r=150$ m), while (assuming operation at up to −90 dB relative signal levels) the communication depth may reach several meters in range. However, even if the electromagnetic wave is limited to propagation over a two-dimensional interface, the power of an isotropic radiating source will quickly decay with distance r from the source as 1/r, thus diminishing the potential advantage of using surface waves for underwater communication.

A need exists for a system which can provide directional long distance underwater communication in which essentially a majority of the energy of a radiating antenna system is directed toward a desired receiver. A need also exists for compact underwater antenna systems with improved communication distance and radiated power characteristics.

SUMMARY OF THE INVENTION

Aspects of the invention relate to methods, apparatuses, and/or systems for generating directional surface radio beams, which propagate along either a water-air or water-seafloor interfaces. It should be appreciated that the surface radio beams may have various degrees of directionality propagation along the interface. For example, the surface radio beams may have a unidirectional propagation, be propagated in a plurality of directions, or have an omnidirectional prorogation. In certain embodiments, a linear array of underwater radio frequency (RF) antennas, emit surface electromagnetic waves propagating along either a water-air or water-seafloor interface, which may provide targeted RF communication with any desired object located near the interface.

In one embodiment, a method of forming a narrow weakly decaying directional surface electromagnetic beam propagating over water-air interface is provided. The method is implemented utilizing a linear array of a plurality of underwater RF antennas emitting surface electromagnetic waves with a pre-defined phase difference $\Delta\phi$ between the neighboring RF antennas, where the beam direction is defined by $\Delta\phi$. In some embodiments, the surface electromagnetic waves propagate along a water-seafloor interface. In some embodiments, the surface electromagnetic beams are utilized for targeting RF communication with any desired object located near the interface and/or determining the location of reflective objects near the interface via reception of reflected signals.

In another embodiment, a system for providing directional radio communication beams is provided. The system includes a RF antenna array located underwater and arranged in a linear configuration. The RF antenna array includes a first RF antenna element configured to transmit surface electromagnetic waves with a pre-defined phase difference $\Delta\phi$ between a neighboring second RF antenna element, wherein the beam direction of the surface electromagnetic waves is defined by $\Delta\phi$ and the surface electromagnetic waves propagate along at least one of a water-seafloor and water-air interface. It should be appreciated that the surface radio beams may have various degrees of directionality propagation along the interface. For example, the surface radio beams may have a unidirectional propagation, be propagated in a plurality of directions, or have an omnidirectional prorogation. The RF antenna array also includes the second RF antenna element configured to receive the surface electromagnetic waves from the first RF antenna element and transmit the surface electromagnetic waves serially to a plurality of neighboring other RF antenna elements of the antenna array. An antenna control unit is configured to control the surface electromagnetic wave phase difference and RF power levels of each of the antenna elements of the antenna array.

In another embodiment, a method for providing directional radio communication beams is provided. The method includes providing a RF antenna array located underwater and arranged in a linear configuration. The method further includes transmitting, from a first RF antenna element of the RF antenna array, an surface electromagnetic waves with a pre-defined phase difference $\Delta\phi$ to a neighboring second RF antenna element of the antenna array, wherein the beam direction of the surface electromagnetic waves is defined by $\Delta\phi$ and the surface electromagnetic waves propagate along at least one of a water-seafloor and water-air interface. It should be appreciated that the surface radio beams may have various degrees of directionality propagation along the interface. For example, the surface radio beams may have a unidirectional propagation, be propagated in a plurality of directions, or have an omnidirectional prorogation. The method also includes receiving the surface electromagnetic waves at the second RF antenna element of the antenna array and serially transmitting, from the second RF antenna element of the RF antenna array, the surface electromagnetic waves with to a plurality of other RF antenna elements of the antenna array.

These methods, apparatuses, and/or systems provide significant advantages over prior art communication and sensor networks. Particularly, the present invention uses a linear array of underwater RF antennas, which emit surface electromagnetic waves propagating along either water-air or water-seafloor interface. The linear array of RF antennas forms a directional surface beam, in which the radiated intensity remains almost constant near the array, exhibiting only a weak logarithmic dependence on distance r from the array, due to the two-dimensional character of surface-beam propagation. It should be appreciated that the surface radio beams may have various degrees of directionality propagation along the interface. For example, the surface radio beams may have a unidirectional propagation, be propagated in a plurality of directions, or have an omnidirectional prorogation. The phase difference $\Delta\phi$ of the RF signal between neighboring RF antennas defines the RF beam direction. By adjusting the phase difference $\Delta\phi$, the narrow two-dimensional surface beam may be sent in any direction over 360°, thus enabling targeted RF communication with any desired object located near the interface. Similarly, the relative RF power applied to neighboring RF antennas (termed "shading" in the art) will also be useful in controlling precise beam parameters, and thus, the radiated field pattern. Thus, the directional RF communication link enables significant improvements in the underwater antenna communication distance and received power and cures the shortcomings of prior art communication and sensor networks mentioned above.

Aspects of the invention also relate to methods, apparatuses, and/or systems for providing an impedance matching enclosure filled with an impedance matching fluid for reducing RF antenna dimensions and improving communication performance of an underwater RF antenna. The terms seawater and saltwater are used interchangeably to describe a water environment with approximately 3.5% salinity and a dielectric constant of ~81. In preferred embodiments, the impedance matching enclosure is filled with impedance matching fluid (i.e. de-ionized water) surrounding a RF antenna to reduce antenna dimensions and improve coupling of electromagnetic energy to the surrounding salt water medium, thereby improving underwater radio communication performance. Improvement in the communication distance and power is expected by closely matching the impedance of the environment to the impedance of the impedance matching fluid surrounding the RF antenna within the enclosure, while keeping this impedance matching fluid conductivity very low in the immediate vicinity of the RF antenna to minimize otherwise unavoidable near-field losses. The impedance matching enclosure performs the dual function of impedance matching and electromagnetic isolation at the same time.

In one embodiment, an RF antenna element includes an impedance matching enclosure filled with an impedance matching fluid for reducing RF antenna dimensions and improving communication performance of an underwater radio antenna. The enclosure has an interior, a width, a height, and a thickness. The enclosure is designed to contain an antenna for transmitting and/or receiving RF signals. An impedance matching fluid surrounds the antenna, wherein the impedance matching fluid has substantially the same impedance as seawater.

In another embodiment, a method for reducing antenna dimensions and improving communication performance of an underwater radio antenna is provided. The method includes reducing antenna dimensions and improving communication performance of an underwater radio antenna by providing a thin enclosure filled with de-ionized water around the antenna.

In another embodiment, a method for reducing antenna dimensions and improving communication performance of an underwater radio antenna by providing an impedance matching enclosure is provided. The method includes providing a RF antenna element including an enclosure having an interior, a width, a height, and a thickness. An RF antenna is enclosed within the enclosure for transmitting and receiving RF signals. The enclosure is filled with an impedance matching fluid surrounding the antenna, wherein the impedance matching fluid has substantially the same impedance as seawater. The enclosure is positioned under water.

These methods, apparatuses, and/or systems provide significant advantages over prior art existing-art underwater RF antennas. Particularly, the present invention utilizes an impedance matching enclosure filled with an impedance matching fluid around a RF antenna. In some embodiments, the impedance matching fluid is de-ionized water. This enables improved coupling of the electromagnetic energy to the surrounding salt-water medium via more efficient impedance matching, while it also drastically reduces power losses due to the high ionic conductivity of seawater in the immediate vicinity of the antenna. Further, RF antenna configurations of the present invention become nearly ten times more compact due to the high relative dielectric constant (~80) of the de-ionized water, as compared to air or vacuum. In some embodiments, the impedance matching enclosure is expected to provide at least a 100 times power improvement compared to the underwater antenna configurations in which the RF antenna is either directly immersed into seawater or is electrically isolated from seawater by standard insulating materials.

Thus, the implementation of the present invention provides significant improvement in the underwater antenna communication distance and received power. In particular, the impedance matching enclosure performs the dual function of impedance matching and electromagnetic isolation at the same time, which greatly reduces size, weight, power consumption, efficiency, and cost of the underwater radio frequency communication links and sensor networks.

Various other aspects, features, and advantages of the invention will be apparent through the detailed description of the invention and the drawings attached hereto. It is also to be understood that both the foregoing general description and the following detailed description are exemplary and not restrictive of the scope of the invention. As used in the specification and in the claims, the singular forms of "a", "an", and "the" include plural referents unless the context clearly dictates otherwise. In addition, as used in the specification and the claims, the term "or" means "and/or" unless the context clearly dictates otherwise.

DETAILED DESCRIPTION OF THE INVENTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other instances, well-known structures and devices are shown in block diagram form in order to avoid unnecessarily obscuring the embodiments of the invention.

Structure and Operation of a Communication and Sensor Network

Figure 1:
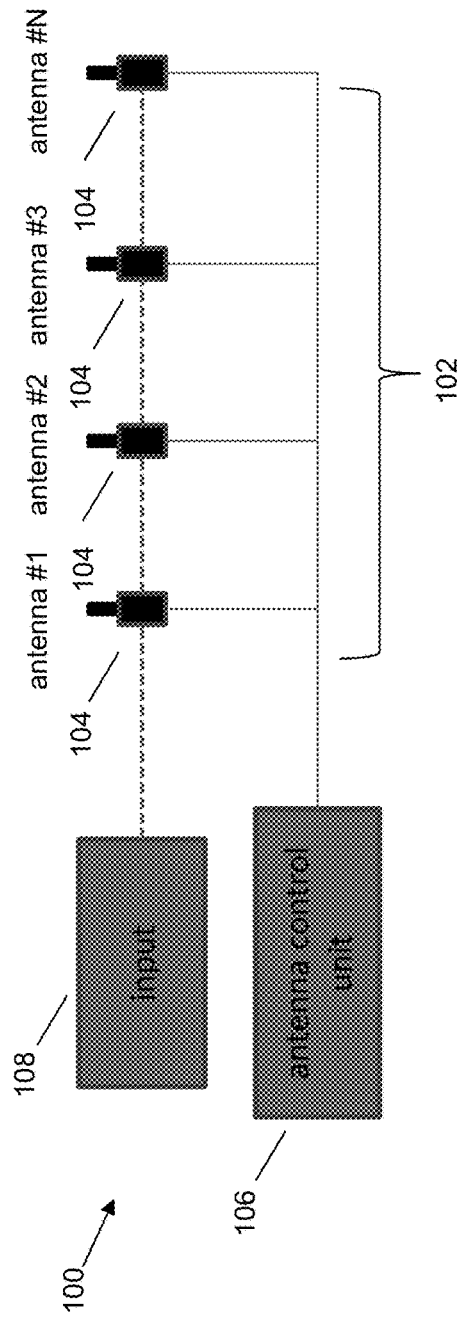
FIG. 1 shows an exemplary system of a communication and sensor network, in accordance with one or more embodiments.

FIG. 1 shows a communication and sensor network 100 in accordance with the present invention which comprises a mechanical antenna array 102 comprising a plurality of antenna elements 104 to receive and transmit radio frequency (RF) signals. The antenna array 102 may be defined as a set of individual antenna elements 104 used for transmitting and/or receiving RF signals, connected together such that their individual currents are transmitted in a specified amplitude or phase relationship. As shown, the plurality of antenna elements 104 of the antenna array 102 may be arranged in a two-dimensional series-fed configuration. The number and arrangement of antenna elements 104 depicted in FIG. 1 represents only one embodiment of the invention. Alternative embodiments of the invention may include more or less antenna elements in various configurations. For example, in some embodiments, the antenna elements 104 may be arranged in a uniform configuration. In other embodiments, the antenna elements 104 may be arranged in non-collinear, non-uniform fashion. It should also be appreciated that the antenna elements 104 may include multiple types of antennas operating at different operating frequency ranges. For example, antenna elements 104 may utilize a single operating frequency or utilize a plurality of specified operating frequencies. In some embodiments, the antenna array 102 may include some or all of a dipole antenna, a monopole antenna, an edge-radiating antenna, a mechanical very low frequency antenna, and the like.

In a preferred embodiment, the antenna array 102 may be located under seawater and propagate a surface electromagnetic wave along the air/water or water/seafloor interface. A surface electromagnetic wave may be defined as an electromagnetic wave that propagates along an interface between different media. In one example, antenna array 102 may prorogate a surface electromagnetic wave along an interface between the air and water. In another example, antenna array 102 may propagate a surface electromagnetic wave along an interface between the water and the seafloor. By adjusting the phase difference Δφ between the individual antenna signals of antenna elements 104, a narrow two-dimensional surface beam may be sent in any direction over 360°. In other words, the direction of the two-dimensional surface RF beam transmitted from each antenna element 104 may be adjusted based on the phase difference between the individual antenna signals or neighboring antennas. It should be appreciated that the surface radio beams may have various degrees of directionality propagation along the interface. For example, the surface radio beams may have a unidirectional propagation, be propagated in a plurality of directions, or have an omnidirectional prorogation.

Because radio signal attenuation severely limits communication over distance in salt water, conventional three-dimensional RF communication schemes are impractical. The present invention addresses this shortcoming by utilizing the linear or two-dimensional array 102 of antenna elements 104 to propagate electromagnetic waves along the water-air or water-seafloor interface. Due to the two-dimensional character of surface-beam, the radiated intensity remains almost constant near the array, exhibiting only a weak logarithmic dependence on distance r from the array.

During operation, input signal 108 may be fed into a first antenna (antenna #1) and distributed serially to the other antennas (antenna #2, #3, # N) via the two-dimensional surface RF beam. To control operation of each of the antenna element 104, antenna control unit 106 may individually adjust the phase and/or power level associated with each antenna element 104. In one embodiment, an antenna control unit 106 may adjust the phase for each antenna element 104 of the antenna array 102 to control the direction of the two-dimensional surface RF beam being transmitted. For example, each antenna element 104 may comprise a phase shifter which enables a controllable phase shift of the RF signal being transmitted. To control the direction of the two-dimensional surface RF beam being transmitted, antenna control unit 106 may provide signals to provide constructive/deconstructive interference to each antenna element 104 to steer the beams in a desired location. It should be appreciated that the surface radio beams may have various degrees of directionality propagation along the interface. For example, the surface radio beams may have a unidirectional propagation, be propagated in a plurality of directions, or have an omnidirectional prorogation. In another embodiment, the antenna control unit 106 may control the power level associated with each antenna 104 of the antenna array 104. In some embodiments, the phase and/or power level adjustment may be made automatically. In other embodiments, the phase and/or power level adjustments may be made manually by an operator.

The antenna control unit 106 may be embodied as an application specific integrated circuit chip and/or some other type of very highly integrated circuit chip. Alternatively, antenna control unit 106 may take the form of a microprocessor, or discrete electrical and electronic components. Memory containing program instruction for the antenna control unit 106 may include non-transitory storage media that electronically stores information. The memory may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage may store dosing algorithms, information determined by the processors, information received from sensors, or other information that enables the functionality as described herein.

Figure 2:
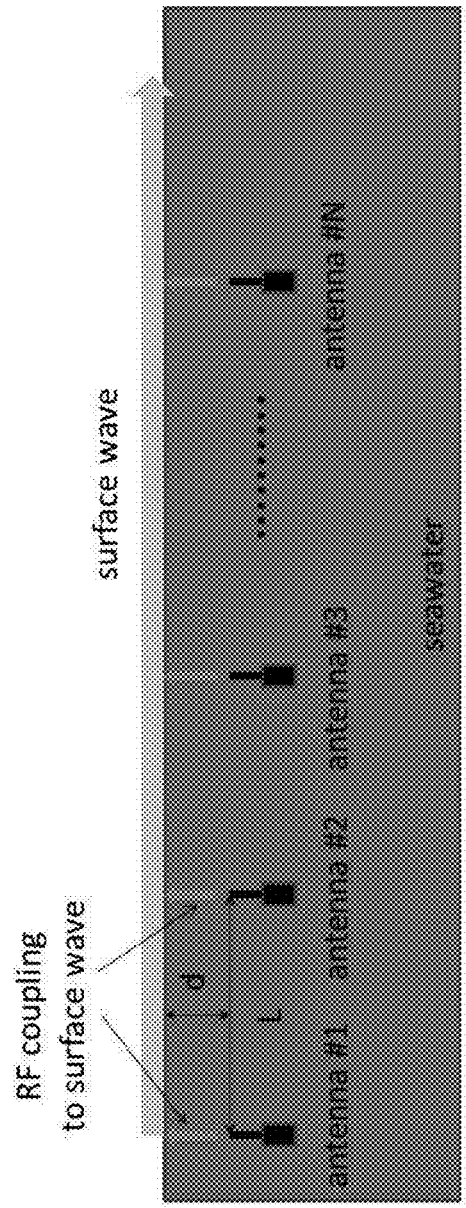
FIG. 2 shows an exemplary schematic geometry of an underwater linear antenna array consisting of N antennas located at depth d and distance L from each other, in accordance with one or more embodiments.

FIG. 2 shows a schematic geometry of an underwater linear antenna array consisting of N antennas located at depth d and distance L from each other. The antenna array is coupled to a surface electromagnetic wave propagating along the air/water interface. By adjusting the phase difference Δϕ between the individual antenna signals, a narrow two-dimensional surface beam may be sent in any direction over 360°. For example, individual RF antennas are located underwater at depth d from the water/air interface, which may be considerably larger than L. The exact L/d ratio is defined by the available RF link margin. This ratio must enable sufficient RF link coupling to the surface electromagnetic wave at the water/air interface.

The antenna elements 104 may be positioned along a straight line at periodic distances L from each other as shown in FIG. 2. The antenna elements 104 in the so-formed linear antenna array may be coupled to the surface electromagnetic wave propagating along the air/water interface. By adjusting the phase difference Δϕ between the individual antenna signals, a narrow two-dimensional surface beam may be sent in a desired direction. It should be appreciated that the surface radio beams may have various degrees of directionality propagation along the interface. For example, the surface radio beams may have a unidirectional propagation, be propagated in a plurality of directions, or have an omnidirectional prorogation. The RF power of the so-formed directional surface beam remains almost constant near the array, exhibiting only a weak logarithmic dependence on distance r from the array, due to the generally two-dimensional character of surface beam propagation.

The same antenna array geometry may be used in underwater sensor networks to determine location of near-surface objects. The narrow surface electromagnetic beam may be scanned over the water/air interface over 360° as described above, while the sensor network detects surface beam reflections by the objects of interest, followed by directional and temporal analysis of the reflected signals.

Compared to the standard implementations of the underwater radio antennas and sensor networks, the linear underwater antenna arrays greatly reduce size, weight, power consumption and cost of the underwater radio frequency communication links and sensor networks by enabling directional RF energy flow.

Either a single frequency or a plurality of specified frequencies may be employed for RF communication to or from the sensor or other controlled devices near the surface, as well as for establishing unambiguous ranging to locate the system sensor, actuator or other deployed devices near the surface boundary (e.g., the air/water interface). These options will apply to both linear and two-dimensional arrays of underwater antennas. Furthermore, as in conventional RF directional systems, the spacing between the antenna elements, though nominally regular, may also be more randomly spaced; appropriate adjustments in the respective phase and power-shading can then adjust the array to the desired beam characteristics.

While the present invention has been described in connection with the preferred embodiments of FIGS. 1 and 2, it is to be understood that other similar embodiments may be used or modifications and additions may be made to the described embodiment for performing the same function of the present invention without deviating there from.

Exemplary Surface-Wave Emission

Figure 3:
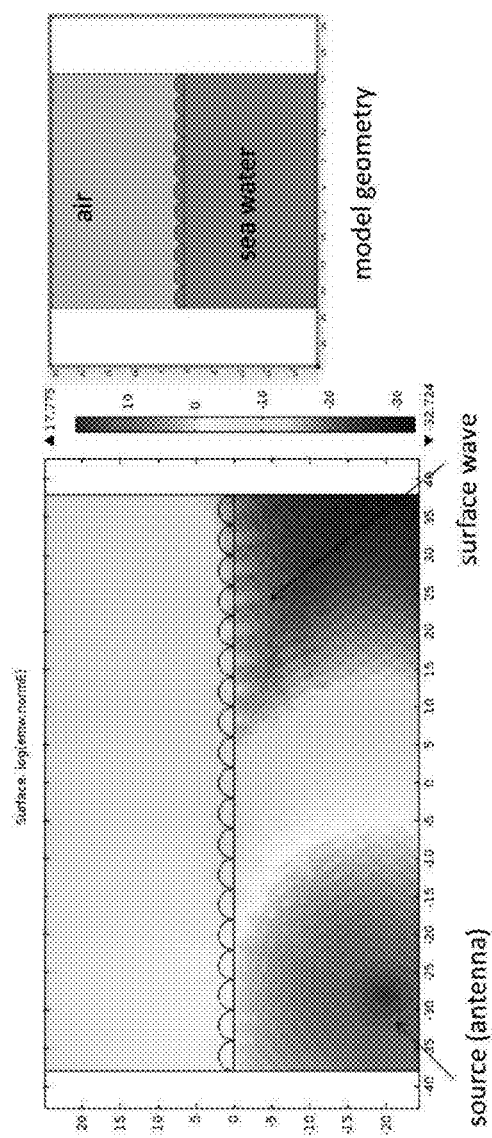
FIG. 3 shows an exemplary surface-wave emission by an underwater antenna source, in accordance with one or more embodiments.

Turning to FIG. 3, an exemplary surface-wave emission by a deep underwater antenna source is illustrated. As shown, a surface-wave emission is emitted by an antenna source in a direction of the source (antenna) arrow. The direction of the surface-wave emission formed at the air-water interface to the right of the antenna source is shown by surface wave arrow. It should be appreciated that the surface radio beams may have various degrees of directionality propagation along the interface. For example, the surface radio beams may have a unidirectional propagation, be propagated in a plurality of directions, or have an omnidirectional prorogation. As shown to the right of the of the surface-wave emission, the electromagnetic model geometry illustrates the wave being propagated on the air/water interface.

Exemplary Plots of Linear Antenna Array Emission

Figure 4:
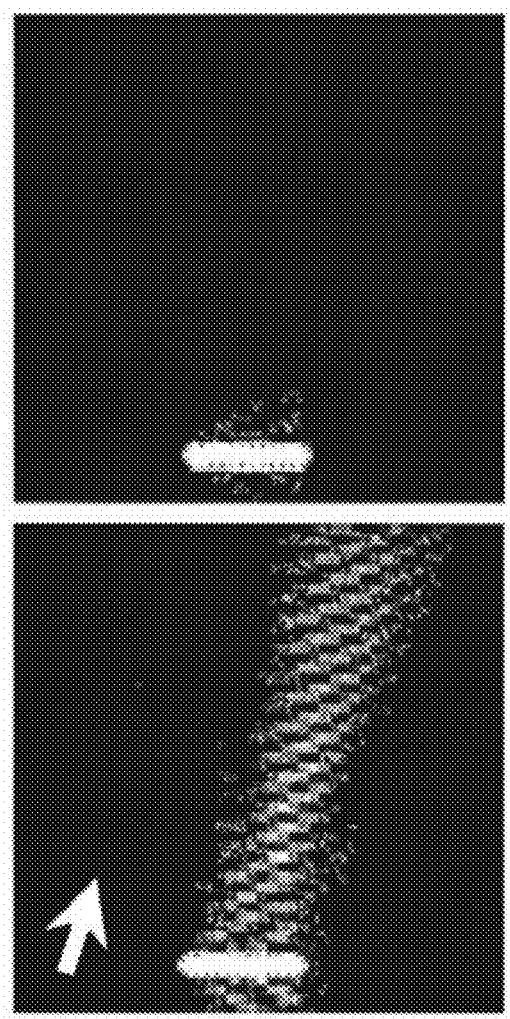
FIG. 4 shows exemplary plots of a linear antenna array emission in 2D and 3D, in accordance with one or more embodiments.

Turning to FIG. 4, a comparison of theoretical plots of a linear antenna array emission in 2D and 3D cases is shown. In this example, a linear antenna array comprises 10 antenna elements, which are indicated by vertical white lines in the corresponding images. The antennas are positioned along a straight line at periodic distances L from each other as shown in FIGS. 1 and 2. The antenna elements in the so-formed linear antenna array are coupled to the surface electromagnetic wave propagating along the air/water or water/seafloor interface. By adjusting the phase difference Δϕ between the individual antenna signals, a narrow two-dimensional surface beam may be sent in any direction over 360°, as demonstrated in FIG. 4. As shown in FIG. 4, the RF power of the so-formed directional surface beam remains almost constant near the array, exhibiting a weak logarithmic dependence on distance r from the array, due to the generally two-dimensional character of surface beam propagation. FIG. 4 also demonstrates that RF signals carried by conventional 3D electromagnetic waves emitted by the antenna elements in the array quickly dissipate with increasing distance from the array. As previously discussed, the dissipation of the conventional 3D electromagnetic waves is due to the radio signal attenuation which severely limits communication over distance in salt water, thus making conventional three-dimensional RF communication impractical for this application. The corresponding beams may be scanned over 360 degrees under water surface by adjusting the phase difference Δϕ between the individual antenna signals.

Configuration and Geometry of an Impedance Matching Technique

Figure 5:
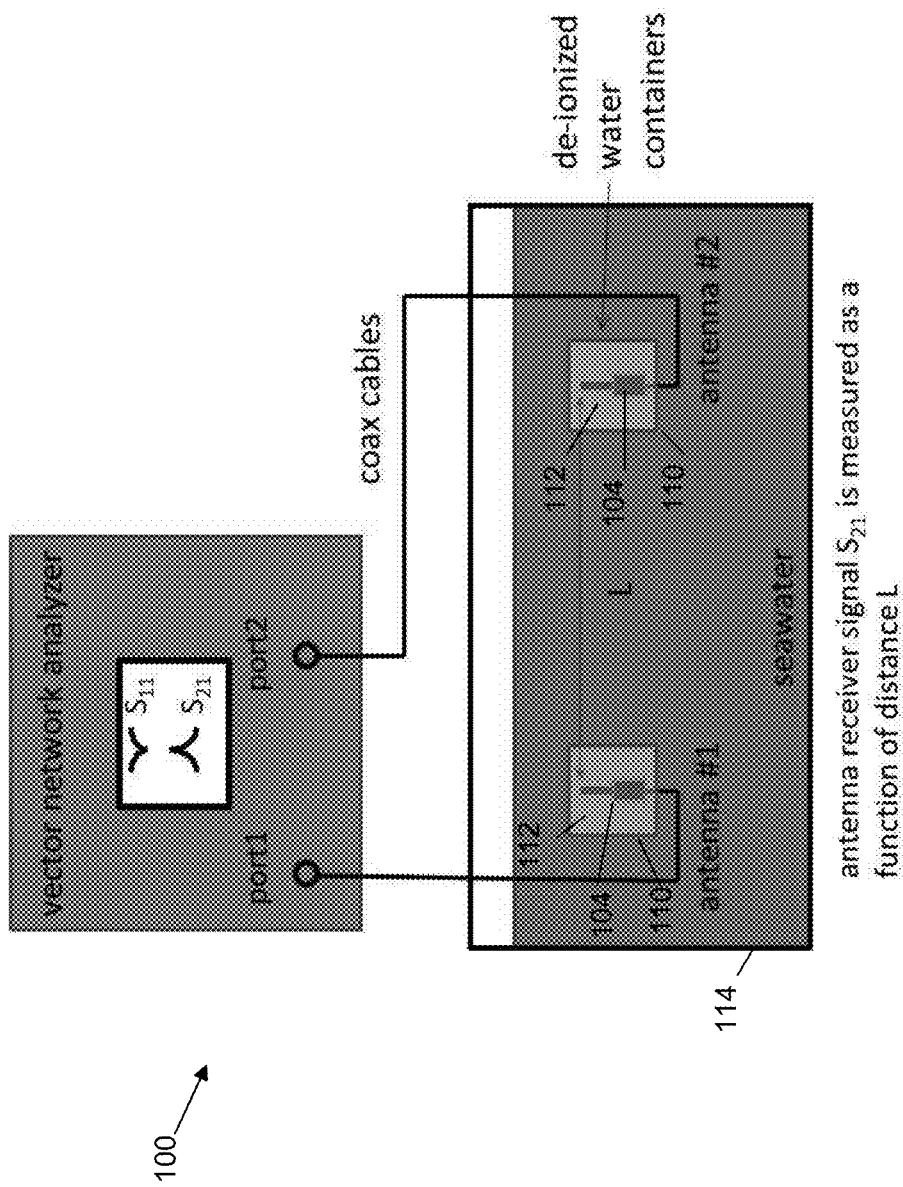
FIG. 5 shows an exemplary configuration and geometry of an impedance matching technique for underwater radio communication, in accordance with one or more embodiments.

FIG. 5 shows an implementation of the present invention in which improved antenna performance is tested as a function of communication distance, L. The communication and sensor network system 100 shown in FIG. 5 may include a plurality of antenna elements 104 enclosed within impedance matching enclosures 110 filled with impedance matching fluid 112. In the illustrated embodiment, the impedance matching enclosures 110 are submerged in seawater 114. However, it is to be understood that the impedance matching enclosures 114 may be located in any number of environments including, but not limited to, fresh, salt, and brackish water environments.

In a preferred embodiment, the impedance matching fluid 112 may be de-ionized (or other highly purified forms of) water and may be utilized to fill the impedance matching enclosures 110 containing the antenna elements 104. The de-ionized water in the radio frequency range has a very large real part of its dielectric constant ε~80, which is also very close to the real part of the dielectric constant of the seawater (~81). In one implementation, an antenna element 104 is surrounded by impedance matching fluid 112 with a dielectric constant substantially the same or similar to that of the environment (i.e. seawater) in which the impedance matching enclosure is submerged. While salinity substantially changes the water conductivity, and therefore, the imaginary part of the dielectric constant of water, the effect of salinity on the real part of ε is relatively small. Moreover, the imaginary part of ε remains considerably smaller than its real part. Therefore, the effective radio-frequency impedances of the de-ionized water and the seawater remain relatively close to each other. It should be appreciated that the impedance matching fluid 112 (i.e. de-ionized water) may have an electrical conductivity substantially lower than the conductivity of the environment (i.e. seawater) in which the impedance matching enclosure is submerged. It should also be appreciated that the impedance matching fluid 112 (i.e. de-ionized water) may have a salinity substantially lower than the salinity of the environment (i.e. seawater) in which the impedance matching enclosure is submerged.

Thus, the impedance matching enclosures 110 filled with the impedance matching fluid 112 (i.e. de-ionized water) surrounding antenna elements 104, schematically shown in FIG. 5, may provide several advantages. First, the de-ionized water provides effective electromagnetic isolation between the antennas and the seawater, thus reducing radio-frequency power losses due to the relatively large electric and/or magnetic RF fields in the immediate vicinity of the antennas. Second, large dielectric constant of de-ionized water enables reduction of the antenna dimensions by a factor of $\varepsilon^{1/2}$~9, which leads to much better antenna efficiency at the reduced size. Third, de-ionized water provides excellent wave impedance matching with the seawater, thus eliminating the very large refractive wave losses which are typically associated with RF antennas operating across, for example, water-air or other dielectric-boundary interfaces.

As a result, the impedance matching enclosure 110 is expected to provide at least a 100 times power improvement compared to the underwater antenna configurations in which the RF antenna is either directly immersed into seawater or is electrically isolated from seawater by standard insulating materials, which would enable significant improvements in the underwater antenna communication distance and received power. In conventional systems, electric fields near the E-field antenna would be rapidly attenuated by the high conductivity of the brackish or salt water and the corresponding magnetic fields (e.g., in loop or H-field antennas) are reduced by eddy-currents in the surrounding conductive media (e.g., salt water). In contrast, in the configuration of the instant invention, these deleterious effects are greatly reduced and system communication efficiencies are consequently improved.

Structure of the Impedance Matching Enclosure

Figure 6:
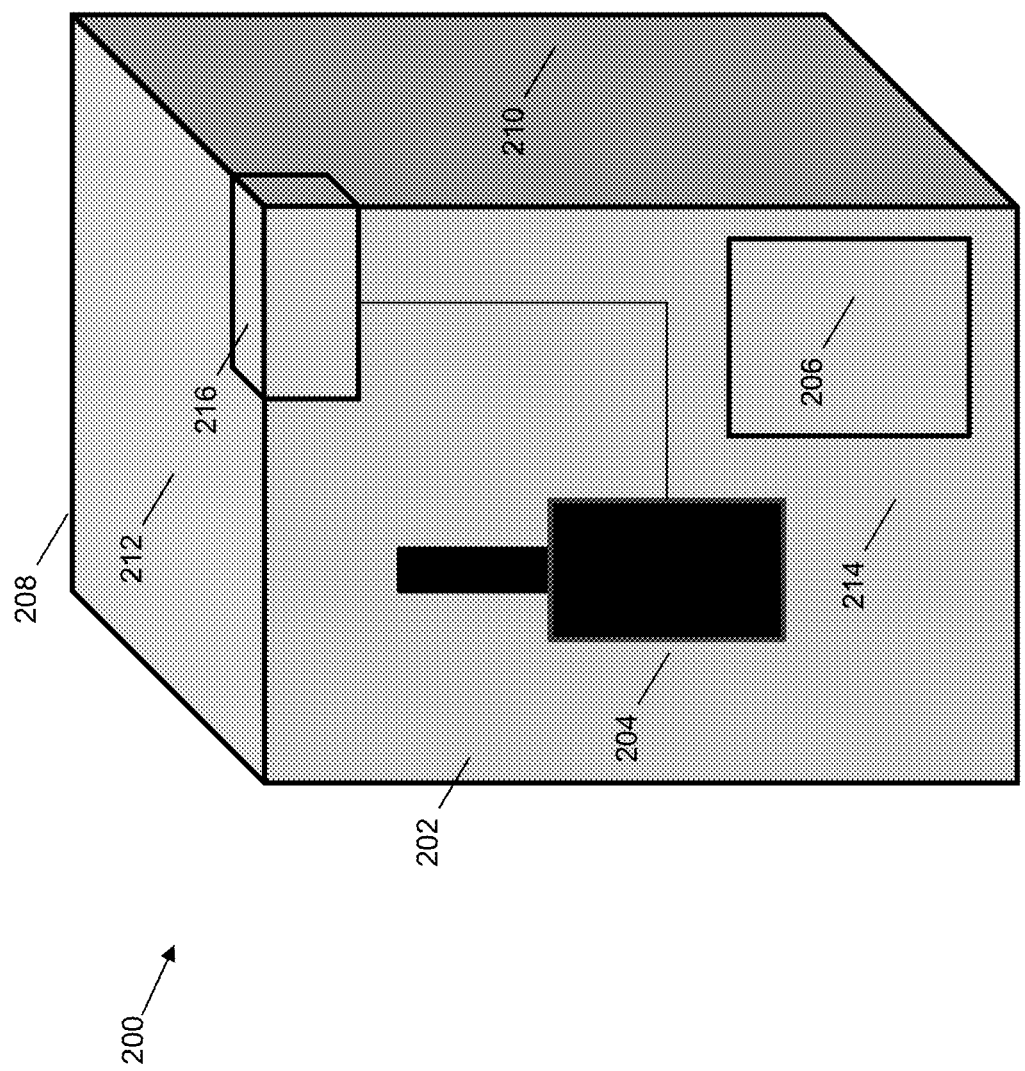
FIG. 6 shows an exemplary impedance matching enclosure, in accordance with one or more embodiments.

In one embodiment, as shown in FIG. 6, an impedance matching enclosure 200 is shown having a substantial rectangular configuration. Particularly, the enclosure 200 comprises a front wall 202 into which an RF antenna element 204 has been provided into which a door 206 has been inserted, a rear wall 208, two side walls 210 and an upper wall or roof 212. In some embodiments, the walls are made of metal plate with a thickness of 1 mm. The thickness may vary, however, between 0.5 mm and 5 mm, more preferably between 0.75 mm and 1.5 mm. In some embodiment, the size and shape of the enclosure 200 may vary based on the application and antenna design.

In some embodiments, the enclosure 200 is configured to enclose an RF antenna element 204 used for transmitting and/or receiving RF signals. It should also be appreciated that the RF antenna element 204 may include multiple types of antennas operating at different operating frequency ranges. For example, RF antenna element 204 may utilize a single operating frequency or utilize a plurality of specified operating frequencies. In some embodiments, the RF antenna element 204 may include a dipole antenna, a monopole antenna, an edge-radiating antenna, a mechanical very low frequency antenna, or the like.

In a preferred embodiment, the impedance matching enclosure 200 may be located under seawater. Because radio signals are rapidly attenuated in fresh, brackish, and seawater, largely due to relatively high ionic conductivity of water, it is difficult to implement for robust long distance undersea communication. To address this problem, the impedance matching enclosure 200 may be filled with an impedance matching fluid 214 for reducing antenna dimensions and improving communication performance of an underwater radio antenna. In preferred embodiments, the impedance matching enclosure is filled with impedance matching fluid (i.e. de-ionized water) around a radio antenna to reduce antenna dimensions and improve coupling of electromagnetic energy to the surrounding salt water medium, thereby improving underwater radio communication performance.

In a preferred embodiment, the impedance matching fluid 214 may be de-ionized (or other highly purified forms of) water. In particular, the impedance matching fluid 214 may have a dielectric constant close the dielectric constant of the seawater. In some embodiments, the impedance matching fluid 214 (i.e. de-ionized water) may have an electrical conductivity substantially lower than the conductivity of the environment (i.e. seawater) in which the impedance matching fluid is enclosed. In some embodiments, the impedance matching fluid 214 (i.e. de-ionized water) may have a salinity substantially lower than the salinity of the environment (i.e. seawater) in which the impedance matching enclosure is submerged. In some embodiments, the impedance matching fluid 214 may provide several advantages including at least one or more of an effective electromagnetic isolation between the antennas and the seawater, a large dielectric constant enabling reduced antenna dimensions and impedance matching with seawater to eliminate refractive wave loss.

To control operation of RF antenna element 204, an antenna control unit 216 may adjust the phase and/or power level associated with RF antenna element 204. In one embodiment, an antenna control unit 216 may provide signals to provide constructive/deconstructive interference to antenna element 204 to control the phase of the antenna element 204. In another embodiment, the antenna control unit 216 may control the power level associated with antenna element 204. In another embodiment, the antenna control unit 216 may control the resonant frequency of the antenna element 204. In some embodiments, the phase, power level, and/or resonant frequency adjustment may be made automatically. In other embodiments, the phase, power level, and/or resonant frequency adjustments may be made manually by an operator. In some embodiments, the antenna control unit 216 may be located within the impedance matching enclosure 200. In other embodiments, the antenna control unit 216 may be located outside the impedance matching enclosure 200.

While the present invention has been described in connection with the preferred embodiments of FIGS. 1, 2, 5 and 6, it is to be understood that other similar embodiments may be used or modifications and additions may be made to the described embodiment for performing the same function of the present invention without deviating there from.

Exemplary Testing Utilizing the Impedance Matching Technique

Figure 7:
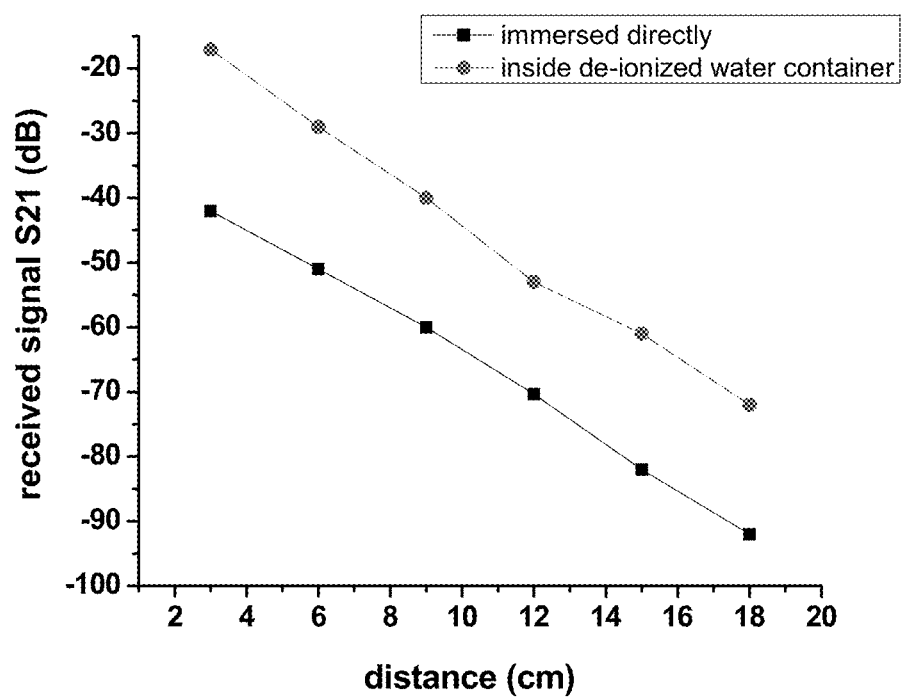
FIG. 7 shows exemplary testing results utilizing an impedance matching technique for underwater radio communication, in accordance with one or more embodiments.

FIG. 7 shows results of side-by-side testing in 0.5%-salinity brackish water of the conventional dipole antenna (lower data points) and the same antenna first enclosed in a container filled with impedance matching fluid (upper data points) and then submerged in 0.5%-salinity brackish water. In particular, an antenna inside a de-ionized water container shows about a 20-dB performance improvement compared to the antenna directly immersed in 0.5%-salinity brackish water. It was observed that relative improvement in antenna performance further increases with an increase in water salinity.

Thus, it is observed that the impedance matching enclosure filled with impedance matching fluid (i.e. de-ionized water) around a radio antenna is shown to reduce antenna dimensions and improve coupling of electromagnetic energy to the surrounding salt water medium, thereby improving underwater radio communication performance. The impedance enclosure provides at least 20 dB power improvement compared to the standard underwater antenna configurations in brackish water, and it was observed that relative improvement in antenna performance further increases with an increase in water salinity. Compared to the standard implementations of the underwater radio antennas, the de-ionized water enclosure greatly reduces size, weight, power consumption and cost of the underwater radio frequency communication links and sensor networks.

This concept is also applicable to other antenna designs. In particular, both resonant (designed for operation around a single frequency) and broadband (designed for operation at high bandwidths and/or at multiple frequencies) antenna geometries benefit considerably from the de-ionized water enclosures. In addition, the described concept is applicable to various antenna array geometries, which may be used to form directional surface wave beams, thus further improving the antenna system communication distance.

Exemplary Implementations Utilizing Tunable ε Metamaterial Antenna Geometry

In some embodiment, immersion into impedance matching fluid (i.e. de-ionized water) may enable compact designs of ELF and VLF metamaterial-based antennas. Very large values of permittivity ε and μ enable drastic reduction of the antenna dimensions, since the electromagnetic radiation wavelength in such media is given as $\lambda_{eff} = \lambda/(\varepsilon\mu)^{1/2}$.

Figure 8:
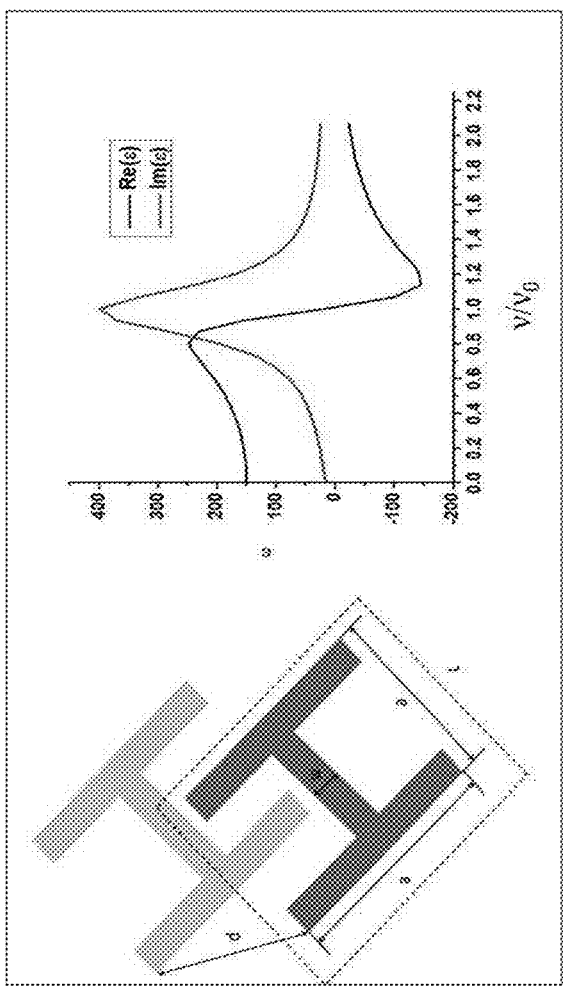
FIG. 8 shows an exemplary implementation of an impedance matching technique utilizing tunable high s metamaterial antenna geometry, in accordance with one or more embodiments.

In FIG. 8, an example of a tunable high permittivity ε metamaterial geometry is shown. It is based on the approach to high ε terahertz (THz) metamaterials. In this geometry, a peak dielectric constant of ~300 is obtained by drastically increasing the effective permittivity through strong capacitive coupling within the metamaterial unit cell, and decreasing the diamagnetic response of the cell, while maintaining low losses. On the other hand, at resonance epsilon near zero (ENZ) behaviour with high losses is observed. The unit cell structure of the high-ε metamaterial shown in FIG. 8 is made of a thin 'I'-shaped metallic patches symmetrically embedded in a dielectric material. For the purpose of impedance matching, impedance matching fluid (i.e. de-ionized water) may be used as one of the components of the background dielectric material, which would bring the effective dielectric constant to ~10000 range, so that such a metamaterial would have properties comparable to the best electrets. The 3D structure of this metamaterial may be described as an array of subwavelength capacitors, in which the dimensions of "I", as well as the gap width (defined by g=L−a; see FIG. 8) and the interlayer spacing d define the capacitor values. The effective dielectric constant of the metamaterial may be estimated as $$\varepsilon_{eff} \approx \varepsilon_s + \frac{4\pi P}{E}, \qquad (1)$$

where $\varepsilon_s$ is the dielectric constant of the substrate, and the polarization density P may be approximated as the dipole moment per unit volume as $$P = \frac{Qa}{L^2 d} \qquad (2)$$

Under the influence of external driving field E, a large amount of surface charge Q is accumulated on each arm of the metallic patch capacitor as the charges in each arm interact with opposite charges in close proximity across the small gap g. Charge accumulation on the edges of the metallic patch leads to an extremely large dipole moment in the unit cell, as the accumulated charge is inversely proportional to the gap width g:

$$Q \propto \frac{\varepsilon_s L^3}{4\pi g} E \qquad (3)$$

As a result, very large values of $\varepsilon_{eff}$ $$\varepsilon_{\textit{eff}} \propto \varepsilon_s \left(1 + \frac{aL}{dg}\right) \quad (4)$$

may be obtained in the low frequency quasi-static approximation. Real and imaginary parts of $\varepsilon_{\textit{eff}}$ numerically calculated for these geometrical parameters are shown in FIG. 8. Broadband high ε behaviour of the metamaterial has been confirmed in these calculations, while metamaterial losses remain modest below $v/v_0=0.5$.

As shown in FIG. 8 a unit cell structure of an artificial high-ε metamaterial, made of a thin 'I'-shaped metallic patches symmetrically embedded in a dielectric material. The 3D structure of this metamaterial may be described as an array of subwavelength capacitors, in which the gap width defined by g=L−a and the interlayer spacing d (exaggerated for clarity) define the capacitor values. FIG. 8 illustrates real and imaginary parts of $\varepsilon_{\textit{eff}}$ numerically calculated for the metamaterial geometry shown in (a) as a function of $v/v_0$. The metamaterial exhibits broadband high ε behavior, while metamaterial losses remain modest below $v/v_0=0.5$.

Exemplary Implementations Utilizing Tunable μ Metamaterial Antenna Geometry

Figure 9:
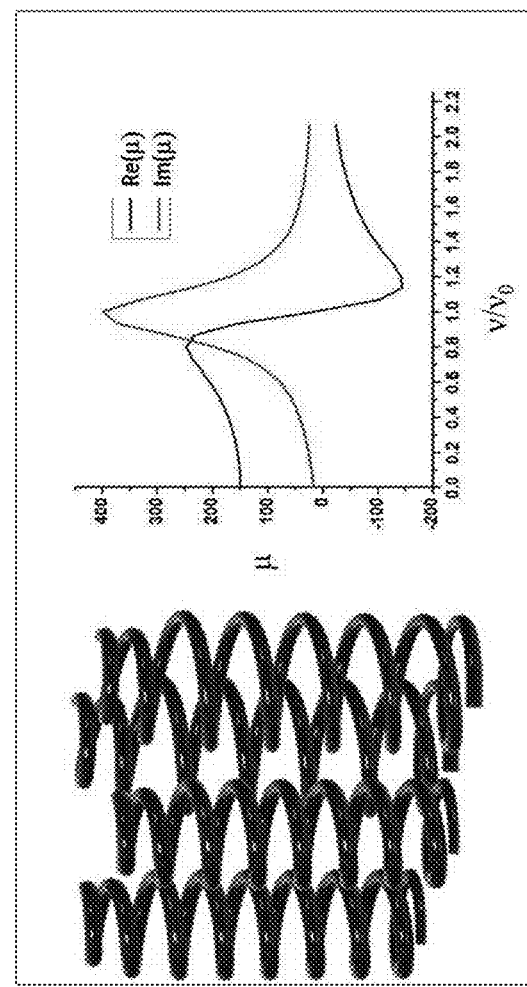
FIG. 9 shows an exemplary implementation of an impedance matching technique utilizing tunable high μ metamaterial antenna geometry, in accordance with one or more embodiments.

In FIG. 9, an example of a tunable high μ metamaterial geometry is shown. Tunable high μ metamaterials may be designed using a conceptually similar approach. However, instead of strong capacitive coupling of the metamaterial unit cells, strong inductive coupling will be used. The unit cell structure of the high-μ metamaterial shown in FIG. 9 is made of coils, which are embedded into a ferrofluid. A water based ferrofluid may be used in order to achieve impedance matching to seawater. The ferrofluids are known to exhibit superparamagnetic behavior, since their individual magnetic nanoparticles are single-domain. When an external magnetic field is applied to an assembly of superparamagnetic nanoparticles, their magnetic moments align along the applied field, leading to a net magnetization. If all the particles may be considered to be roughly identical (as in the case of a homogeneous ferrofluid), and the temperature is low enough, then the magnetization of the assembly is $$M(H, T) = nm \tanh\left(\frac{mH}{kT}\right), \quad (5)$$

where n~0.1 is the volume fraction, and m is their magnetic moment. Thus, ferrofluid magnetization reaches about 10-15% of the saturation magnetization of the parent ferromagnetic compound. The magnetic permeability of the ferrofluid is then $$\mu_{\textit{ferrofluid}} = dM/dH \sim n\mu_{\textit{bulk}}, \quad (6)$$

so that rather large background values of $\mu_{\textit{ferrofluid}}\sim 100$ may be obtained. Saturation magnetization of the ferrofluid is reached in modest magnetic fields of a few tens of Gauss. High tunability of the ferrofluid-based metamaterial may be obtained while tuning its frequency response. The effective permeability of the metamaterial will behave as $$\mu_{\textit{eff}} = \mu_{\textit{ferrofluid}} \left(1 - \frac{F\left(\frac{\omega}{\omega_0}\right)^2}{\left(\frac{\omega}{\omega_0}\right)^2 - 1 + i\frac{\Gamma}{\omega_0}\left(\frac{\omega}{\omega_0}\right)}\right), \quad (7)$$

near the metamaterial resonances. As shown in FIG. 9, values of $\mu_{\textit{eff}}\sim 1000$ may be obtained, while at resonance μ near zero (MNZ) behavior with high losses is observed.

As shown in FIG. 9 a unit cell structure of an artificial high-μ metamaterial, made of coils is immersed in a ferrofluid. FIG. 9 illustrates real and imaginary parts of $\mu_{\textit{eff}}$ numerically calculated for the metamaterial geometry shown in FIG. 5 as a function of $v/v_0$.

Exemplary Flowchart

Figure 10:
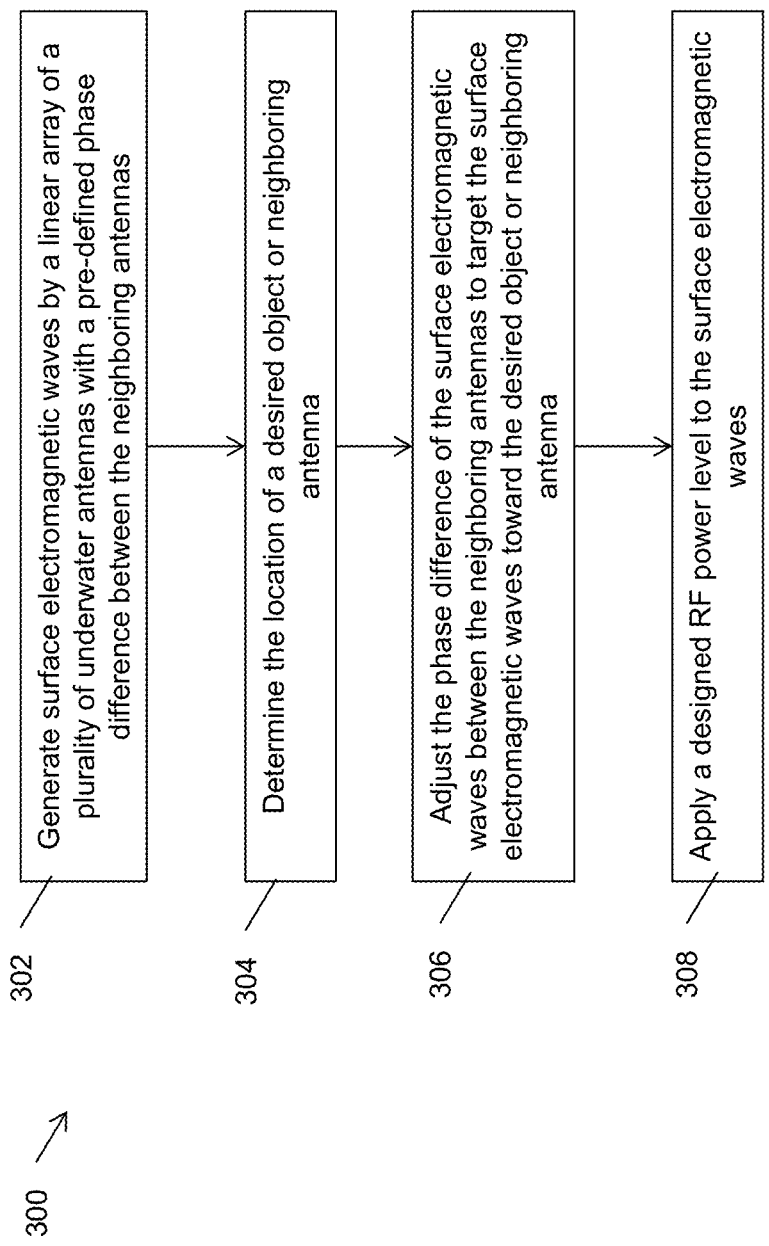
FIG. 10 shows a flowchart of a method of providing directional radio communication beams, in accordance with one or more embodiments.

FIG. 10 shows a flowchart of a method 300 of providing directional radio communication beams, in accordance with one or more embodiments.

In an operation 302, surface electromagnetic waves are generated by a linear array of a plurality of underwater antennas with a pre-defined phase difference Δϕ between the neighboring antennas.

In an operation 304, the located of a desired object or neighboring antenna is determined.

In an operation 306, the phase difference of the surface electromagnetic waves Δϕ between the neighboring antennas is adjusted to target the surface electromagnetic waves toward the desired object or neighboring antenna.

In an operation 308, a desired RF power level is applied to the surface electromagnetic waves.

Figure 11:
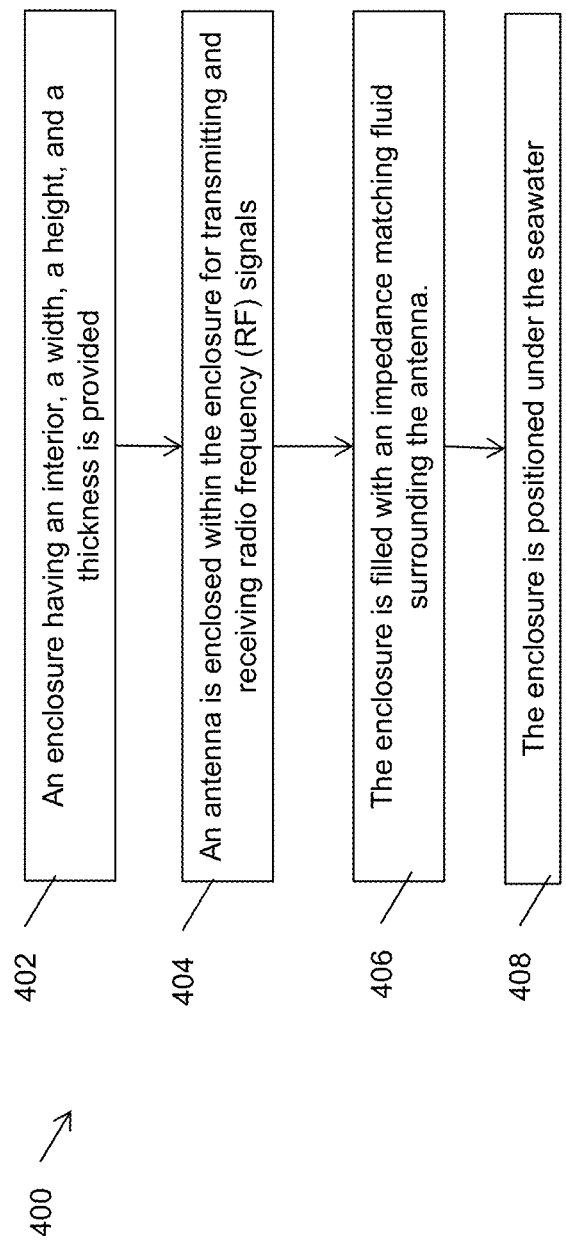
FIG. 11 shows a flowchart of a method for reducing antenna dimensions and improving communication performance of an underwater radio antenna by providing an impedance matching enclosure, in accordance with one or more embodiments.

FIG. 11 shows a flowchart of a method 400 for reducing antenna dimensions and improving communication performance of an underwater radio antenna by providing an impedance matching enclosure, in accordance with one or more embodiments.

In an operation 402, an enclosure having an interior, a width, a height, and a thickness is provided.

In an operation 404, an antenna is enclosed within the enclosure for transmitting and receiving radio frequency (RF) signals.

In an operation 406, the enclosure is filled with an impedance matching fluid surrounding the antenna. In one embodiment, the impedance matching fluid has substantially the same impedance as seawater. In another embodiment, the impedance matching fluid is de-ionized water.

In an operation 408, the enclosure is submerged in seawater.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

What is claimed is:

1. A system for providing directional radio communication beams, the system comprising:
   an antenna array located underwater and arranged in a linear configuration, the antenna array comprising:
   a first antenna element configured to transmit surface electromagnetic waves with a pre-defined phase difference Δϕ between a neighboring second antenna element, wherein the beam direction of the surface electromagnetic waves is defined by Δϕ and the surface electromagnetic waves propagate along at least one of a water-seafloor and water-air interface;
   the second antenna element configured to receive the surface electromagnetic waves from the first antenna element and transmit the surface electromagnetic waves serially to a plurality of neighboring other antenna elements of the antenna array;

an antenna control unit configured to control the surface electromagnetic wave phase difference and RF power levels of each of the antenna elements of the antenna array.

2. The system of claim 1, wherein the surface electromagnetic waves propagate along a water-seafloor interface.

3. The system of claim 1, wherein the surface electromagnetic beams are used for targeted RF communication with any desired object located near the interface.

4. The system of claim 1, wherein the surface electromagnetic beams are used to determine the location of reflective objects near the interface via reception of reflected signals.

5. The system of claim 1, wherein the surface electromagnetic beams are generated and directed by also controlling the relative RF power levels applied to the plurality of underwater antennas.

6. A system for providing directional radio communication beams, the system comprising:

an antenna array located underwater and arranged in a linear configuration, the antenna array comprising:

a first antenna element configured to transmit surface electromagnetic waves with a pre-defined phase difference $\Delta\phi$ between a neighboring second antenna element, wherein the beam direction of the surface electromagnetic waves is defined by $\Delta\phi$ and the surface electromagnetic waves propagate along at least one of a water-seafloor and water-air interface;

the second antenna element configured to receive the surface electromagnetic waves from the first antenna element and transmit the surface electromagnetic waves serially to a plurality of neighboring other antenna elements of the antenna array;

wherein the first and second antenna elements are located within an enclosure for transmitting and receiving the surface electromagnetic waves, the enclosure including an impedance matching fluid surround the antenna;

an antenna control unit configured to control the surface electromagnetic wave phase difference and RF power levels of each of the antenna elements of the antenna array.

7. The system of claim 6, wherein the surface electromagnetic waves propagate along a water-seafloor interface.

8. The system of claim 6, wherein the surface electromagnetic beams are used for targeted RF communication with any desired object located near the interface.

9. The system of claim 6, wherein the surface electromagnetic beams are used to determine the location of reflective objects near the interface via reception of reflected signals.

10. The system of claim 6, wherein the surface electromagnetic beams are generated and directed by also controlling the relative RF power levels applied to the plurality of underwater antennas.

11. The system of claim 6, wherein the elements of the antenna array comprise at least one of a dipole antenna, a monopole antenna, an edge-radiating antenna, and a mechanical very low frequency antenna.

12. The system of claim 6, wherein the impedance matching fluid immediately surrounding the antenna has salinity substantially lower than the salinity of seawater.

13. The system of claim 6, wherein the impedance matching fluid immediately surrounding the antenna has an electrical conductivity substantially lower than the conductivity of the water medium into which the impedance matching enclosure is submerged.

14. The system of claim 6, wherein the impedance matching fluid immediately surrounding the antenna has a dielectric constant substantially similar to that of the water medium into which the impedance matching enclosure is submerged.

15. The system of claim 6, wherein the antenna is configured to transmit and received signals at a plurality of frequencies.

* * * * *